(12) United States Patent
White et al.

(10) Patent No.: US 11,707,771 B2
(45) Date of Patent: Jul. 25, 2023

(54) CLEANING PROCESS FOR A POWDER TRANSFER SYSTEM

(71) Applicants: BAXTER INTERNATIONAL INC., Deerfield, IL (US); BAXTER HEALTHCARE SA, Glattpark (CH)

(72) Inventors: Frank Lionel White, Cary, IL (US); John Chi-Young Lu, Chicago, IL (US); Greg Allen Hain, Grayslake, IL (US); Cathelene Valerie Compton, Chester, SC (US)

(73) Assignees: BAXTER HEALTHCARE SA, Glattpark (CH); BAXTER INTERNATIONAL INC., Deerfield, IL (US)

( * ) Notice: Subject to any disclaimer, the term of this patent is extended or adjusted under 35 U.S.C. 154(b) by 403 days.

(21) Appl. No.: 16/827,509

(22) Filed: Mar. 23, 2020

(65) Prior Publication Data
US 2020/0316658 A1    Oct. 8, 2020

Related U.S. Application Data

(60) Provisional application No. 62/829,810, filed on Apr. 5, 2019.

(51) Int. Cl.
*B08B 9/032* (2006.01)
*B08B 3/02* (2006.01)
(Continued)

(52) U.S. Cl.
CPC ........ *B08B 9/0323* (2013.01); *B01F 35/1452* (2022.01); *B08B 3/02* (2013.01);
(Continued)

(58) Field of Classification Search
None
See application file for complete search history.

(56) References Cited

U.S. PATENT DOCUMENTS

| 5,024,561 A | 6/1991 | Kitagawa |
| 5,603,826 A | 2/1997 | Welch |
| (Continued) | | |

FOREIGN PATENT DOCUMENTS

| GB | 2448237 A | 10/2008 |
| JP | S5992052 A | 5/1984 |
| (Continued) | | |

OTHER PUBLICATIONS

JPS5992052 English Translation, accessed on Aug. 2022. (Year: 1984).*

(Continued)

*Primary Examiner* — Eric W Golightly
*Assistant Examiner* — Arlyn I Rivera-Cordero
(74) *Attorney, Agent, or Firm* — Marshall, Gerstein & Borun LLP

(57) ABSTRACT

A method of cleaning a complex powder transfer system including providing a powder transfer system having a washing fluid source, a spray device valve in fluid communication with the washing fluid source, a backflush valve in fluid communication with the washing fluid source, a receiving device having an upper chamber, a lower chamber, and a membrane filter disposed between the upper and lower chambers. The method includes opening the backflush valve to initiate a backflush cycle, running the backflush cycle to wash the upper chamber with a fluid, and closing the backflush valve after the backflush cycle completes. The method includes opening the spray device valve to initiate a spray device cycle, running the spray device cycle to wash the lower chamber with fluid, and closing the spray device (Continued)

valve after the spray device cycle completes. The method includes opening a pressure valve to provide PCA to the receiving container.

29 Claims, 8 Drawing Sheets

(51) Int. Cl.
  *B08B 3/10* (2006.01)
  *B08B 9/08* (2006.01)
  *B01F 35/10* (2022.01)

(52) U.S. Cl.
  CPC .............. *B08B 3/10* (2013.01); *B08B 9/0322* (2013.01); *B08B 9/08* (2013.01); *B08B 2203/007* (2013.01)

(56) References Cited

U.S. PATENT DOCUMENTS

| | | |
|---|---|---|
| 6,010,038 A | 1/2000 | Dietrich |
| 6,843,283 B2 | 1/2005 | Dietrich |
| 7,168,460 B2 | 1/2007 | Dietrich et al. |
| 8,662,797 B2 | 3/2014 | Ruggero et al. |
| 10,150,124 B2 | 12/2018 | Altin et al. |
| 2002/0002909 A1 | 1/2002 | Frey et al. |
| 2009/0162150 A1 | 6/2009 | Dietrich |
| 2016/0045943 A1 | 2/2016 | Curran et al. |
| 2019/0009934 A1 | 1/2019 | Dietrich |

FOREIGN PATENT DOCUMENTS

| | | | | |
|---|---|---|---|---|
| JP | 2007-038205 A | | 2/2007 | |
| WO | WO-2008110623 A2 | * | 9/2008 | ......... B01D 46/0067 |

OTHER PUBLICATIONS

JP2007038205 English Translation, accessed on Aug. 2022. (Year: 2007).*

International Application No. PCT/US2020/024179, Invitation to Pay Additional Fees, and, Where Applicable, Protest Fee, dated Jun. 26, 2020.

International Application No. PCT/US2020/024179, International Search Report and Written Opinion, dated Aug. 21, 2020, pp. 22.

* cited by examiner

CLEANING PROCESS FOR A POWDER TRANSFER SYSTEM

FIELD OF DISCLOSURE

The present disclosure generally relates to a powder transfer system, and, more particularly, to a method or process for cleaning a powder transfer system.

BACKGROUND

A known powder transfer system 10 is depicted in FIG. 1 and is used to automate a process for adding raw material powder to a mix tank. The powder transfer system (PTS) is a pneumatic conveying system using both vacuum and pressure to move raw material powders from a big bag station 14 to a mix tank 18. Specifically, the powder is transferred to a cylindrical container 22 that sits on top of the mix tank 18. The cylindrical container 22 has a filter 26 at one end and is coupled to the mix tank 18 at a discharge conduit 30 at an opposite end. To fill the cylindrical container 22 with powder, the discharge conduit 30 is closed and a feed valve 34 connected to the cylindrical container 22 is opened. The powder is pulled from the big bag station 14 by a vacuum 38 via conduit 42, and the powder is dispensed through the feed valve 34 and into the cylindrical container 22. Once the cylindrical container 22 is filled to a desired amount with powder, the feed conduit 42 closes and the discharge conduit 30 opens. To deliver the powder from the cylindrical container 22 to the mix tank 18, a closure valve 46 opens to permit gas from a gas source 50 to flow through a conduit 54 and into the cylindrical container 22 to evacuate the cylindrical container 22 of powder.

During this process, microbial and pharmaceutical residues may be left behind and/or may develop in the many crevices of the PTS equipment. The FDA requires that the equipment is cleaned before another batch of raw material powder can be processed. A clean-in-place (CIP) process is a desired practice over a clean-out-of-place (COP) process as a CIP process affords many benefits, such as reduced cleaning cycle times, optimized use of a cleaning agent and water, and elimination of manual cleaning. However, the challenge in designing an effective cleaning process intensifies with the increasing complexity of the equipment. In some cases, due to the complexity of the equipment, it may not be practical or even feasible to employ a fully automatic CIP system. In these cases, the equipment must be cleaned via a semi-automatic process or disassemble and manually clean out of place. Known CIP methods for cleaning may leave microbial, pharmaceutical, and cleaning solution residue behind.

SUMMARY

In accordance with a first exemplary aspect, a method of cleaning a complex powder transfer system may be provided. The method may include providing a powder transfer system including a washing fluid source, a spray device valve in fluid communication with the washing fluid source, a backflush valve in fluid communication with the washing fluid source, a receiving device having an upper chamber in fluid communication with the backflush valve and a lower chamber in fluid communication with the spray device valve, and a membrane filter disposed between the upper and lower chambers. Further, the method may include opening the backflush valve to initiate a backflush cycle, running the backflush cycle to wash the upper chamber with a fluid from the washing fluid source, closing the backflush valve after the backflush cycle completes, opening the spray device valve to initiate a spray device cycle, running the spray device cycle to wash the lower chamber with a fluid from the washing fluid source where the lower chamber being washed separately from the upper chamber, closing the spray device valve after the spray device cycle completes, and opening a pressure valve to provide a processed control air (PCA) to the receiving container.

In accordance with a second exemplary aspect, a method of cleaning a big bag station of a powder transfer system may be provided. The method may include providing a big bag station including a bag body, a washing fluid source coupled to the bag body, an agitator coupled to the bag body, a first valve in fluid communication with the washing fluid source and the bag body, a second valve in fluid communication with a pressure source and the bag body, and a drain valve. The method may further include running a prewash cycle by opening the first, second, and drain valves and providing a washing fluid via the washing fluid source to the bag body. Further, the method may include closing first, second, and drain valves after the prewash cycle is complete, operating an agitator, running a bag body wash cycle by opening the first valve to fill the bag body with a washing fluid, closing the first valve after the bag body is filled with the washing fluid, agitating the washing fluid in the bag body, and draining the washing fluid from the bag body by opening the drain valve.

In accordance with a third exemplary aspect, a method of cleaning a complex powder transfer system may be provided. The method may include providing a powder transfer system including a washing fluid source, a spray device valve in fluid communication with the washing fluid source, a backflush valve in fluid communication with the washing fluid source, a receiving device having an upper chamber in fluid communication with the backflush valve and a lower chamber in fluid communication with the spray device valve, and a membrane filter disposed between the upper and lower chambers. Further, the method may include opening the backflush valve to initiate a backflush cycle, and running the backflush cycle to wash the upper chamber with a fluid from the washing fluid source. The backflush cycle may include four steps. The method may further include closing the backflush valve after the backflush cycle completes, opening the spray device valve to initiate a spray device cycle, and running the spray device cycle to wash the lower chamber with a fluid from the washing fluid source where the lower chamber is washed separately from the upper chamber. The spray device cycle may include four steps. The method may include closing the spray device valve after the spray device cycle completes, and alternating the four steps of the spray device cycle with the four steps of the backflush cycle, and opening a pressure valve to provide a processed control air (PCA) to the receiving container.

In further accordance with any one or more of the foregoing first, second, or third aspects, a method of cleaning a complex powder transfer system and a big bag station may further include any one or more of the following preferred forms.

In a preferred form, running the backflush cycle may include running a first step of the backflush cycle by providing ambient water from the washing fluid source at a pressure in a range between approximately 45 psi and approximately 50 psi.

In a preferred form, running the backflush cycle may include running a second step after running the first step.

In a preferred form, running the second step may include providing a clean-in-place (CIP) solution from the washing fluid source to the upper chamber.

In a preferred form, running the second step may include providing the CIP solution at a pressure in a range between approximately 45 psi and approximately 50 psi.

In a preferred form, running the backflush cycle may include running a third step of the backflush cycle after running the second step.

In a preferred form, running the third step may include providing a second CIP solution from the washing fluid source to the upper chamber.

In a preferred form, the second CIP solution may have a different acidity than the first CIP solution.

In a preferred form, running the third step may include providing the second CIP solution at a pressure in a range between approximately 45 psi and approximately 50 psi.

In a preferred form, running the backflush cycle may include running a final step by providing water from the washing fluid source to the upper chamber.

In a preferred form, running the final step may include providing hot water at a temperature in a range between approximately 75 degrees Celsius and approximately 90 degrees Celsius and at a pressure in a range between approximately 45 psi and approximately 50 psi.

In a preferred form, running the backflush cycle may include running at least four backflush cycles.

In a preferred form, the washing fluid in a first step may be water and the washing fluid in a second step may be a CIP solution.

In a preferred form, opening the pressure valve may include opening the pressure valve after running the backflush cycle and before running the spray device cycle.

In a preferred form, opening the pressure valve may include opening the pressure valve before opening the spray device valve such that the lower chamber is sprayed with cleaning fluid while PCA blows in the lower chamber.

In a preferred form, the method may include providing an air barrier between the membrane filter and the lower chamber during the spray device cycle.

In a preferred form, running the spray device cycle may include running a first step of the spray device cycle by spraying water into the lower chamber.

In a preferred form, running the first step of the spray device cycle may include spraying ambient water into the lower chamber at a pressure in a range between approximately 40 psi and approximately 50 psi.

In a preferred form, running the first step of the spray device cycle may include running the first step of the spray device cycle after the first step of the backflush cycle completes.

In a preferred form, running the spray device cycle may include running a second step of the spray device cycle after running the first step of the spray device cycle.

In a preferred form, the second step may include spraying a CIP solution from the washing fluid source into the lower chamber.

In a preferred form, running the second step of the spray device cycle may include spraying the CIP solution into the lower chamber at a pressure in a range between approximately 40 psi and approximately 50 psi.

In a preferred form, running the second step of the spray device cycle may include running the second step of the spray device cycle after the second step of the backflush cycle completes and before the third step of the backflush cycle initiates.

In a preferred form, running the spray device cycle may include running a third step after running the second step of the spray device cycle.

In a preferred form, the third step may include spraying a second CIP solution into the lower chamber.

In a preferred form, the second CIP solution may have a different acidity than the first CIP solution.

In a preferred form, running the third step may include spraying the second CIP solution into the lower chamber at a pressure in a range between approximately 40 psi and approximately 50 psi.

In a preferred form, running the third step of the spray device cycle may include running the third step of the spray device cycle after the third step of the backflush cycle completes and before the final step of the backflush cycle initiates In a preferred form, running the spray device cycle may include running a final step of the spray device cycle after running the third step of the spray device cycle.

In a preferred form, running the final step may include spraying water into the lower chamber.

In a preferred form, running the final step may include spraying hot water at a temperature in a range between approximately 75 degrees Celsius and approximately 90 degrees Celsius into the lower chamber and at a pressure in a range between approximately 40 psi and approximately 50 psi.

In a preferred form, running the bag body wash cycle may include running a first step of the bag body wash cycle by providing a CIP solution via the washing fluid source into the bag body through the first valve, closing the first valve, agitating the CIP solution in the bag body, and opening the drain valve when the first step is complete.

In a preferred form, running the first step may include providing the CIP solution to the bag body at a pressure in a range between approximately 45 psi and approximately 50 psi and agitating the CIP solution.

In a preferred form, running the bag body wash cycle may include running a second step of the bag body wash cycle after the first step.

In a preferred form, the second step may include providing a different CIP solution from the washing fluid source to the bag body through the first valve, closing the first valve, agitating the different CIP solution in the bag body, and opening the drain valve when the second step is complete.

In a preferred form, running the second step may include providing the different CIP solution into the bag body at a pressure in a range between approximately 45 psi and approximately 50 psi and agitating the different CIP solution in the bag body.

In a preferred form, running the bag body wash cycle may include running a third step of the bag body wash cycle after the second step.

In a preferred form, the third step may include providing water from the washing fluid source to the bag body through the first valve, closing the first valve, agitating the water in the bag body, and opening the drain valve when the third step is complete.

In a preferred form, running the third step may include providing the water into the bag body at a pressure in a range between approximately 45 psi and approximately 50 psi and agitating the water in the bag body.

In a preferred form, the method may include opening the pressure valve to eject the washing fluid from the bag body.

In a preferred form, the method may include operating a vacuum to pull the washing fluid through the pressure valve, wherein the vacuum is operating at full capacity.

DETAILED DESCRIPTION

A clean-in-place (CIP) process for complex powder transfer systems is disclosed herein and introduces various processing aides and techniques for the effective removal of manufacturing process residues, cleaning solution residues, and microbial loads to meet the cleaning demands found in the pharmaceutical and other industries. Individual CIP processes are disclosed in which a tank mounted receiving device can be cleaned separately from a big bag station, affording manufacturing flexibility and cost savings.

Figure 2:
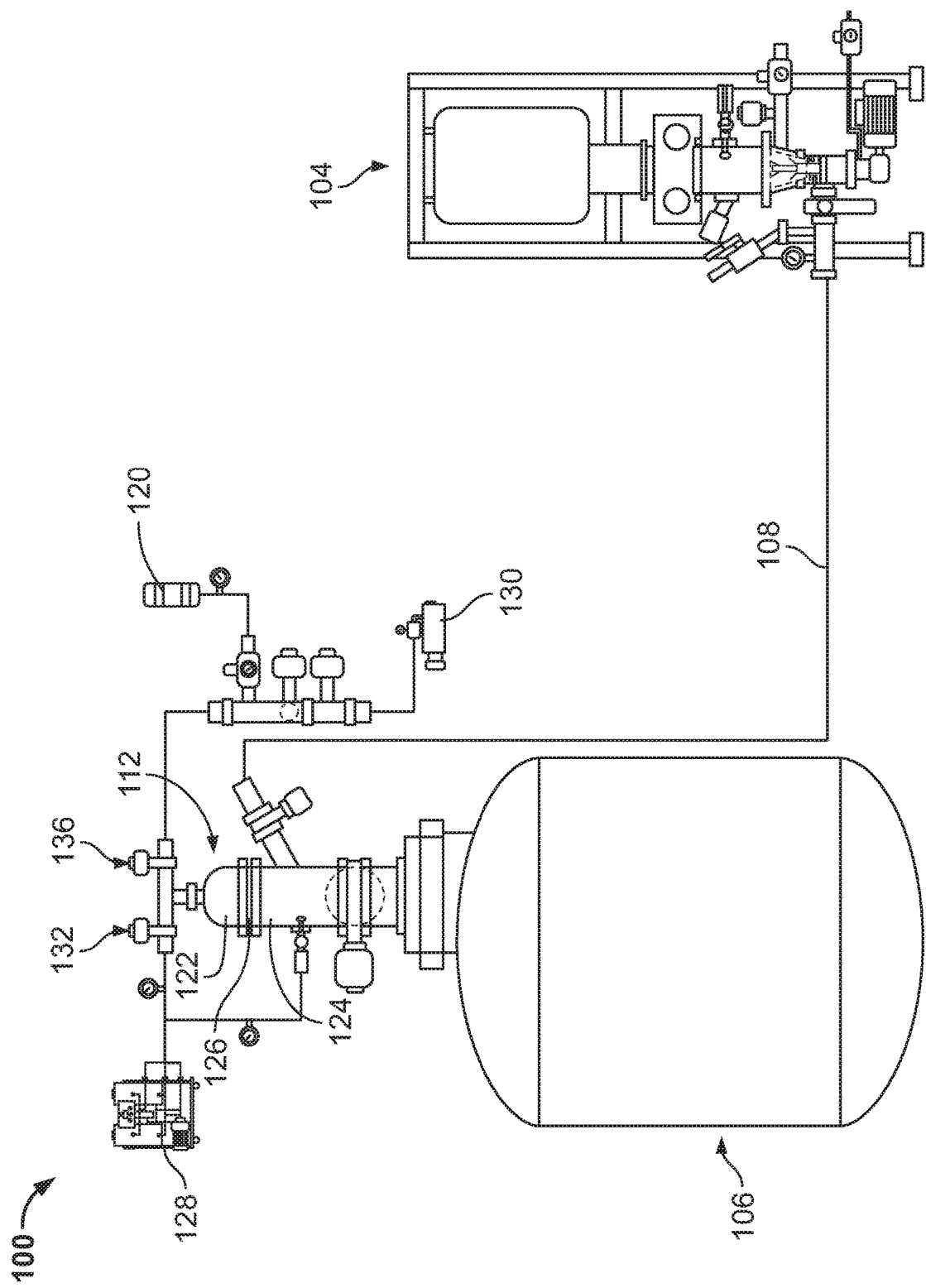
FIG. 2 is a schematic diagram of a PTS capable of running a clean-in-place (CIP) process in accordance with the teachings of the present disclosure.

Turning now to FIG. 2, a powder transfer system (PTS) 100 operates by using both vacuum and pressure to move powders from a big bag station 104 through a feed conduit 108 to a cylindrical receiving device 112 mounted on top of a reaction vessel, reactor, or mixing tank 116, where the powder is then ejected by pressure from a pressure or gas source 120. The cylindrical receiving device 112 includes a first chamber 122 and a second chamber 124 separated by a membrane filter 126. Daily cleaning of PTS 100 reduces risk of rouging and/or corrosion of the woven membrane 126 where pitting corrosion can occur before being visible.

Figure 3:
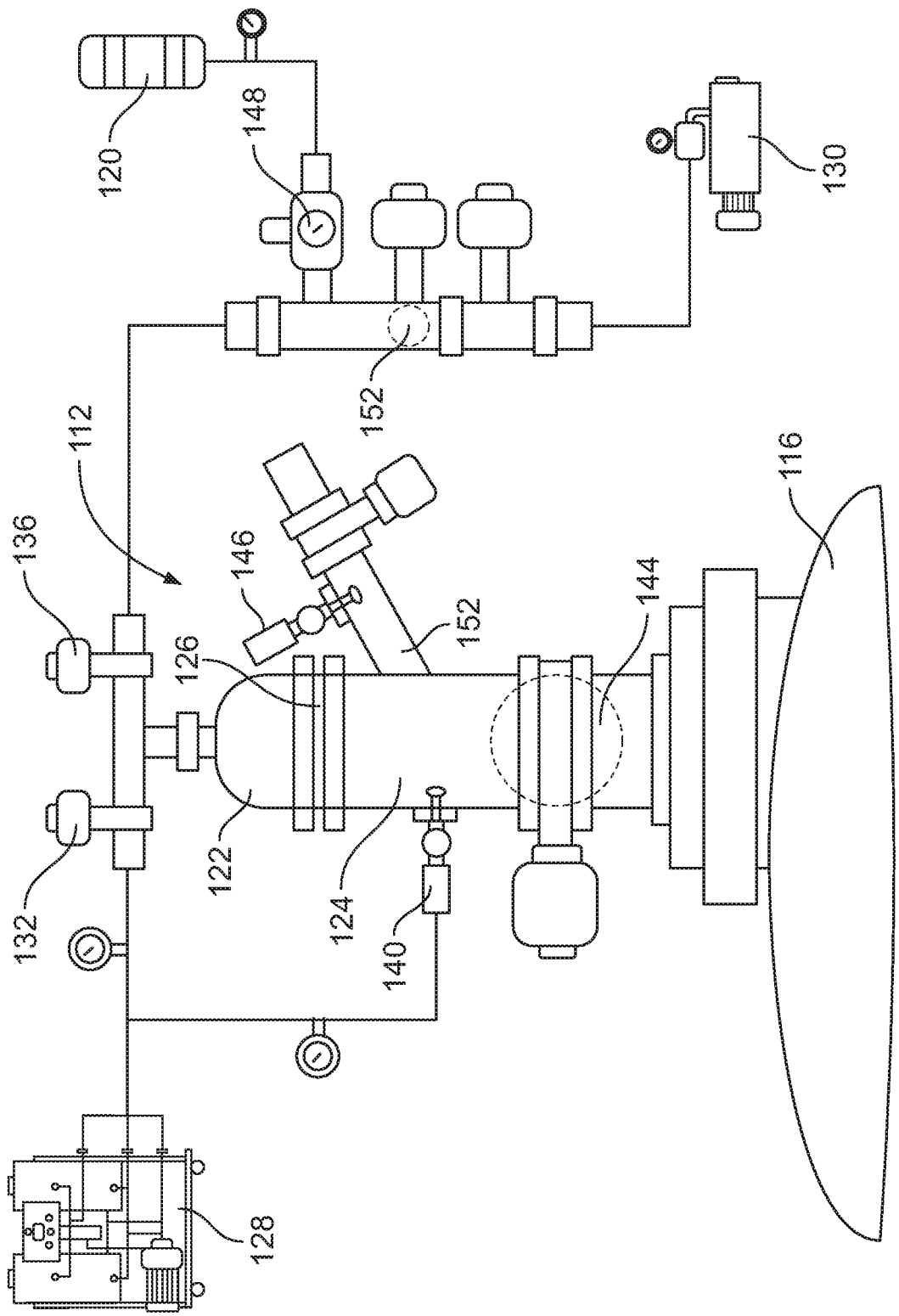
FIG. 3 is a schematic diagram of a receiving device of the PTS of FIG. 2 assembled in accordance with the teachings of the present disclosure.

In FIGS. 2 and 3, the cylindrical receiving device 112 of the PTS 100 is coupled to a washing fluid source 128, the pressure source 120 (e.g., providing process controlled air (PCA)), and a vacuum source 130. A first valve 132 may be operated to deliver a washing fluid (e.g., water or cleaning fluid) to the receiving device 112, and a second valve 136 may be operated to deliver pressure from the pressure source 120 (with a pressure valve 148) or to draw a vacuum (with a vacuum valve 152) into or from the receiving device 112. The fluid source 128, also known as a skid, is operatively coupled to the cylindrical receiving device 112 to dispense fluid into the upper chamber 122 by way of the first valve 132 to backflush the filter 126 and clean the upper chamber 122. The skid 128 is also configured to dispense washing fluid into the lower chamber 124 by way of a spray device valve 140 connected to a spray device. The flow rate of the supply 132 may be changed, depending on pipe sizes and other factors of the PTS 100, to provide the desired flow velocity and thereby achieve greater spray coverage of the upper chamber 122. A butterfly valve 144 is operable to eject washing fluid contained in the receiving device 112 to drain it from the system 100. The receiving device 112 includes a pneumatically controlled drain at the bottom of the vessel, which remains open during the ejection of the washing fluid. A second spray device valve 146 may be located at product inlet 150. The second spray device valve, or product inlet spray device valve 146, may be used in series, alternating, bursts, and/or simultaneously with the spray device valve 140 to provide superior spray coverage and cleaning. As previously mentioned, daily cleaning of the PTS 100 reduces risk of rouging and/or corrosion, including pitting corrosion that can occur at the butterfly valve 144.

Figure 4:
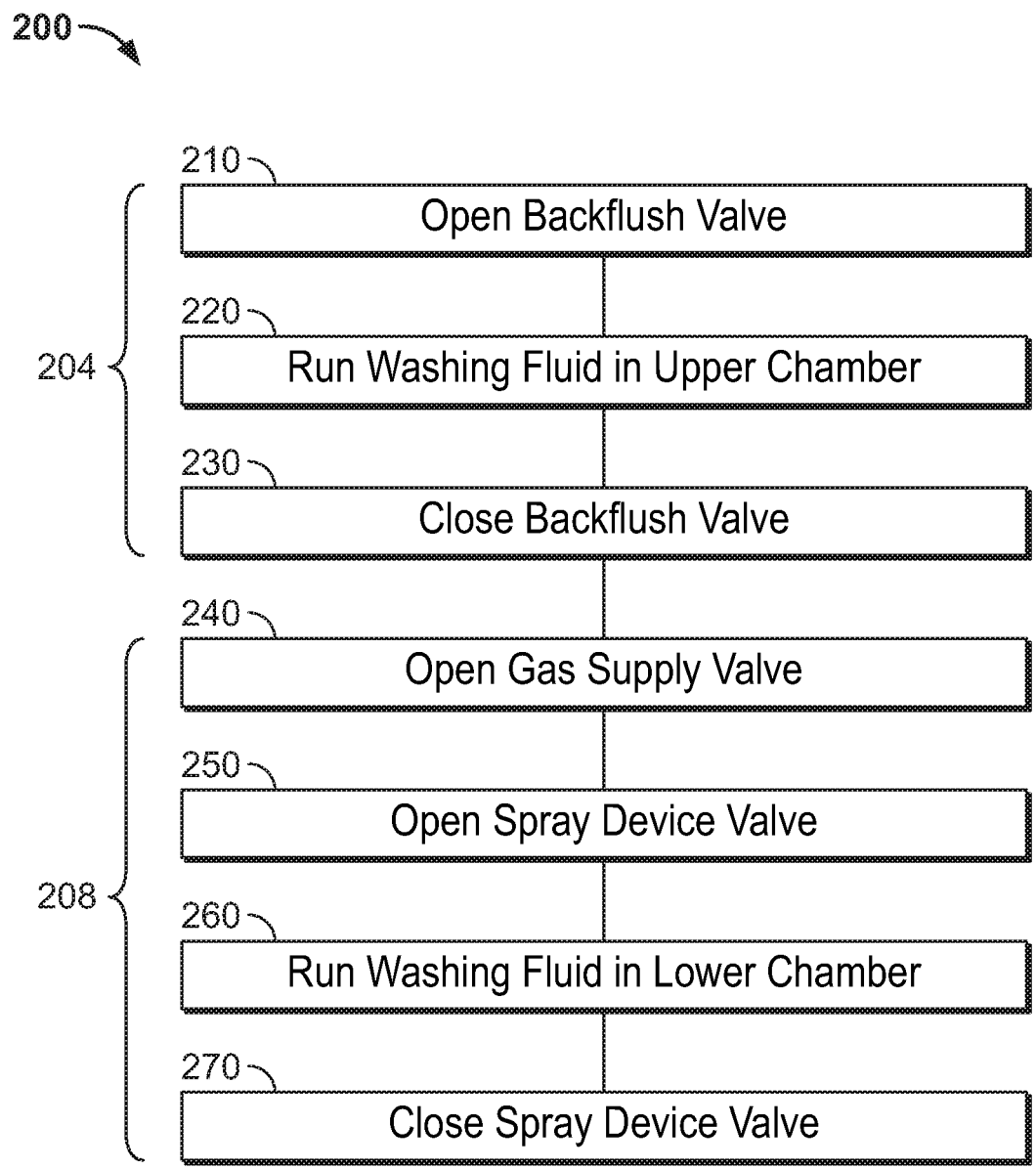
FIG. 4 is a flow diagram of a first exemplary CIP process or method of cleaning the receiving device of FIG. 3 in accordance with the teachings of the present disclosure.

A first exemplary method or process 200 of cleaning the cylindrical receiving device 112, such as the cylindrical device 112 of FIGS. 2 and 3, is depicted in the flow diagram of FIG. 4. Generally speaking, the method includes two main phases: a backflush cycle 204 (including method steps 210, 220, and 230) and a spray device cycle 208 (including method steps 250, 260, 270), and will be described in detail with reference to FIG. 3. The two main phases are sequenced in a "top-down" approach to limit reintroducing microbial and pharmaceutical residue after certain areas of the receiving device 112 have been washed. The top-down approach is achieved by actuating a sequence of steps during each cycle and opening and closing valves to thoroughly wash particular areas before continuing to the next phase.

The method 200 of cleaning the receiving device 112 depicted in FIG. 4 begins with the second valve 136 closed and the butterfly valve 144 open. The backflush cycle 204 of this example involves four separate steps where each of the four steps includes opening 210 the first valve 132, running 220 washing fluid through the upper chamber 122 of the receiving device 112, and closing 230 the first valve 132.

The backflush cycle 204 begins with opening (e.g., step 210) the first valve 132, and performing a first step of the backflush cycle 204, which includes running (e.g., step 220) washing fluid across (or backflushing) the membrane filter 126 along with the upper chamber 122 with ambient water from the skid 128 at a pressure in a range between approximately 45 psi and approximately 50 psi for a duration between one to two minutes at 200 liters per minute (LPM). The first step of the backflush cycle 204 terminates by closing (e.g., step 230) the first valve 132. A second step of the backflush cycle 204, which begins after the first step is completed, includes opening the first valve 132 to backflush the membrane filter 126 and the upper chamber 122 with a CIP 100 solution (e.g., 3 to 6% CIP Solution) from the skid 128 at a pressure in a range between approximately 45 psi and approximately 50 psi for a duration of one to five minutes, then the first valve 132 closes. A third step of the backflush cycle 204 begins by opening the first valve 132 and backflushing the membrane filter 126 along with the upper chamber 122 with a CIP 200 solution (e.g., 2 to 4% CIP Solution) from the skid 128 at a pressure in a range between approximately 45 psi and approximately 50 psi for a duration of one to five minutes, then the first valve 132 is closed. Finally, a fourth step of the backflush cycle 204 includes opening the first valve 132 to backflush the membrane filter 126 and the upper chamber 122 with hot water (e.g., at a temperature between 75 degrees C. and 90 degrees C., and preferably, in a range of approximately 80 degrees C. to approximately 85 degrees C.) from the skid 128 at a pressure in a range between approximately 45 psi and approximately 50 psi for a duration of one to five minutes, then the first valve 132 is closed. The second valve 136 and the pressure valve 148 are opened allowing PCA to flow through the receiving device 112 at a pressure in a range between approximately 45 psi and approximately 50 psi for a duration of one minute, then the second valve 136 and the pressure valve 148 are closed. Before or after the aforementioned steps, the valves 132, 136, 144 and upper and lower chambers 122, 124 of the receiving device 112 may be sprayed with ambient water or washing fluid. Depending on the cleaning requirements of the particular industry utilizing the PTS 100 (e.g., food, cosmetic, pharmaceutical industries), the parameters of each step of the backflush cycle 204 may be different. For example, the timing of each step, concentration, temperature, or type of cleaning solution, and/or the applied pressure may be changed to meet industry standards and requirements.

In one example, ambient water is used in the first step, rather than using hot water, as using ambient water prevents issues relative to cleaning and subsequent cross-contamination of the PTS equipment. For example, when the pharmaceutical powder is dextrose, cleaning the equipment with hot water can lead to degradation (e.g., caramelization) of the dextrose residue in difficult to clean places and on seals, which may lead to cross-contamination of subsequent batches as it cannot be removed easily. To avoid caramelization and thus difficult cleaning, an ambient water rinse is performed in the first step of each cycle.

CIP 100 cleaning agent is a blend of potassium hydroxide, an advanced surfactant system, and other performance-enhancing ingredients that provide multiple cleaning mechanisms. This low foaming product removes a wide range of process residues and is ideal for use in CIP applications. CIP 200 Acid cleaning agent is a blend of citric acid and an advanced surfactant system that provides multiple cleaning mechanisms. This low foaming cleaning agent is ideal for use in CIP, clean-out-of-place (COP), and manual applications including derouging.

Figure 5:
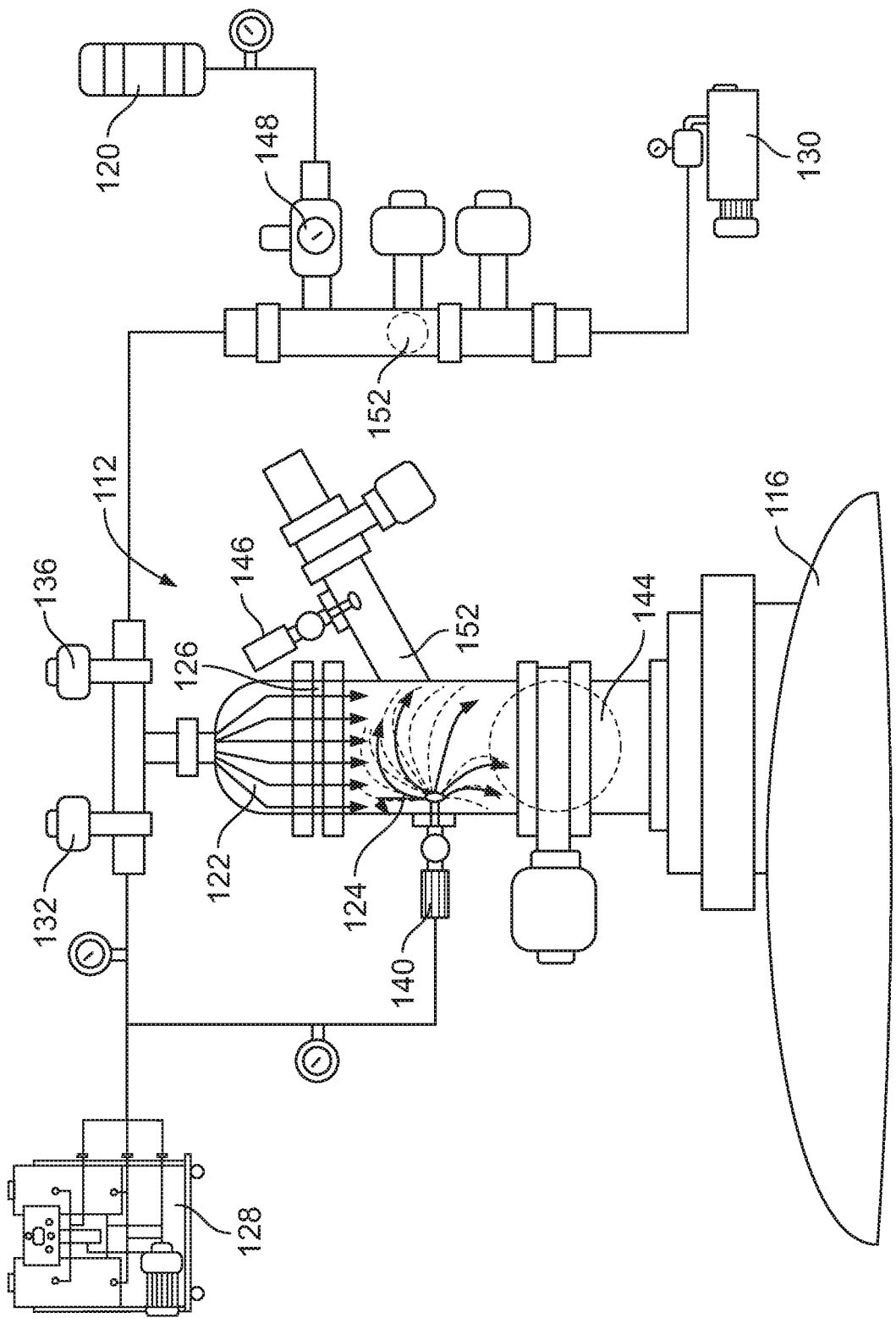
FIG. 5 is a schematic diagram of the receiving device of FIG. 3 during a spray device cycle.

Turning to FIG. 5, the spray device cycle 208 of the CIP method 200 of FIG. 4 is illustrated. The spray device cycle 208 continues with the first valve 132 closed, the butterfly valve 144 open, and the second valve 136 closed. The method of operating the spray device cycle 208 may include a plurality of steps, and in the following example, the spray device cycle 208 includes four separate steps where each of the four steps includes opening 250 the spray device valve 140, opening the product inlet spray device valve 146, running 260 washing fluid through the lower chamber 124 of the receiving device 112, closing 270 the spray device valve 140, and closing the product inlet spray device valve 146. The pressure valve 148 is opened at the beginning of the spray device cycle 208 so that PCA is permitted to flow at a pressure in a range between approximately 40 psi and approximately 50 psi (e.g., 42 to 48 psi) into the receiving device 112 through the duration of running the spray device cycle 208. As shown in FIG. 5, PCA flows through the receiving device as the spray device valve sprays washing fluid into the lower chamber 124. As such, an air barrier is formed between the lower chamber 124 and the membrane filter 126 to prevent microbial and pharmaceutical residue from being reintroduced into the upper chamber 122 while the lower chamber 124 is being washed.

A first step of the spray device cycle 208 begins by opening (e.g., step 250) the spray device valve 140, opening the product inlet spray device valve 146, and running (e.g., step 260) washing fluid (i.e., by spraying via the spray device) through the lower chamber 124 with ambient water from the skid 128 at a pressure in a range between approximately 40 psi and approximately 50 psi (e.g., 42 to 48 psi) for a duration of one minute. The spray device valve 140 and the product inlet spray device valve 146 close (e.g., step 270). A second step of the spray device cycle 208 begins after the first step is completed, and the spray device valve 140 and the product inlet spray device valve 146 open to spray the lower chamber 124 with the CIP 100 solution (e.g., 3 to 6% CIP Solution) from the skid 128 at a pressure in a range between approximately 40 psi and approximately 50 psi (e.g., 42 to 48 psi) for a duration between one to five minutes, then the spray device valve 140 and product inlet spray device valve 146 close. A third step of the spray device cycle 208 begins by opening the spray device valve 140 and the product inlet spray device valve 146 and spraying the lower chamber 124 with the CIP 200 solution (e.g., 2 to 4% CIP Solution) from the skid 128 at a pressure in a range between approximately 40 psi and approximately 50 psi (e.g., 42 to 48 psi) for a duration between one to five minutes, then the spray device valve 140 and product inlet spray device valve 146 close. Finally, in a fourth step of the spray device cycle 208, the spray device valve 140 and product inlet spray device valve 146 open to spray the lower chamber 124 with hot water (e.g., at a temperature between 75 degrees C. and 90 degrees C., and preferably, in a range of approximately 80 degrees C. to approximately 85 degrees C.) from the skid 128 at a pressure in a range between approximately 40 psi and approximately 50 psi (e.g., 42 to 48 psi) for a duration between one to ten minutes, then the spray device valve 140 and product inlet spray device valve 146 close. The second valve 136 and the pressure valve 148 remain open, allowing PCA to flow through the receiving device 112 for a duration of one minute, then the valves 136 and 148 close. In this example, the product inlet spray device valve 146 operates simultaneously with the spray device valve 140. However, in other examples, the product inlet spray device valve 146 may operate (i.e., open, spray, close) after or before the operation of the spray device valve 140.

Depending on the cleaning requirements of the particular industry utilizing the PTS 100 (e.g., food, cosmetic, pharmaceutical industries), the parameters of each step of the spray device cycle 208 may be different. For example, the timing of each step, concentration, temperature, or type of cleaning solution, and/or the applied pressure may be changed to meet industry standards and requirements.

As shown in FIG. 5, PCA continuously flows through the pressure valve 148 and the second valve 136 and into the receiving device 112 to enhance the distribution of the washing fluid and cleaning action in the receiving device 112. The PCA also creates an air barrier between the filter 126 and the lower chamber 124 to prevent microbial and pharmaceutical residue from being reintroduced into the upper chamber 122 while the lower chamber 124 is washed.

Figure 6:
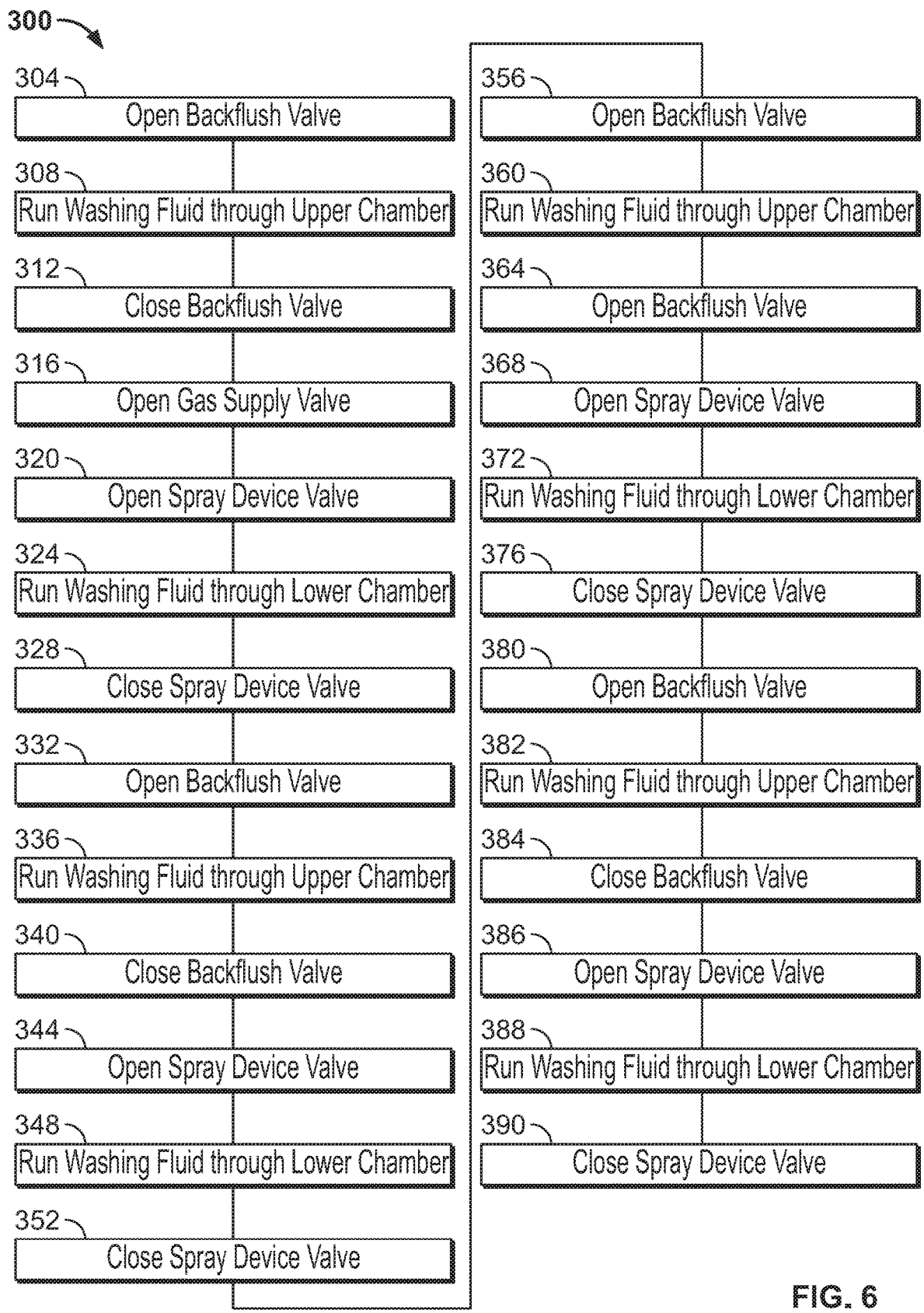
FIG. 6 is a flow diagram of a second exemplary CIP process or method of cleaning the receiving device of FIG. 3 in accordance with the teachings of the present disclosure.

A second exemplary method or process 300 of cleaning the receiving device 112, such as the cylindrical device 112 of FIGS. 2 and 3, is depicted in the schematic diagram of FIG. 6. In this example, the cleaning process 300 for the cylindrical receiving device 112 involves alternating backflush and spray device cycles, repeated with various cleaning solutions, followed by a drying cycle. In particular, the backflush and spray device cycles run in an alternating manner such that a first step of the backflush cycle and a first step of the spray device cycle are performed before a second step of the backflush cycle is performed. Drying times after cleaning can be reduced by the incorporation of heated air blown from top down and through spray devices 140, 146.

The cleaning process or method 300 begins with the second valve 136 closed and the butterfly valve 144 opened. The backflush cycle of this example includes four separate steps where each of the four steps includes opening the first valve 132, running washing fluid through the upper chamber 122 of the receiving device 112, and closing the first valve 132. A first step of the backflush cycle includes a step of opening 304 the first valve 132 and a step of backflushing 308 the membrane filter 126 and the upper chamber 122 with ambient water from the skid 128 at a pressure in a range between approximately 45 psi and approximately 50 psi for a duration of one to two minutes. A step of closing 312 the first valve 132 completes the first step of the backflush cycle. Immediately following the first step of the backflush cycle, the second valve 136 and the pressure valve 148 open in step 316 allowing PCA to flow at a pressure in a range between approximately 40 psi and approximately 50 psi (e.g., 42 to 48 psi). A first step of the spray device cycle begins by a step of opening 320 the spray device valve 140 and product inlet spray device valve 146 and a step of running 324 washing fluid through the lower chamber 124 of the receiving device 112 with ambient water from the skid 128 at a pressure in a range between approximately 40 psi and approximately 50 psi (e.g., 42 to 48 psi) for a duration of one to two minutes. The spray device valve 140 and product inlet spray device valve 146 close in step 328 to complete the first step of the spray device cycle.

A second step of the backflush cycle may immediately follow the first step of the spray device cycle. In the second step of the backflush cycle, the first valve 132 opens in step 332 to backflush in step 336 the membrane filter 126 and the upper chamber 122 with a CIP 100 solution (e.g., 4 to 6% CIP Solution) from the skid 128 at a pressure in a range between approximately 45 psi and approximately 50 psi for a duration of one to two minutes. The first valve 132 closes in step 340 to complete the second step of the backflush cycle. The second valve 136 and the pressure valve 148 then open to allow PCA to flow at a pressure in a range between approximately 40 psi and approximately 50 psi (e.g., 42 to 48 psi) through the receiving device 112. PCA flows from the pressure valve 148, through the second valve 136, and into the top of the receiving device 112 where it exits past the butterfly valve 144 into the vessel 116. A second step of the of the spray device cycles begins by opening 344 the spray device valve 140 and product inlet spray device valve 146 and a step of running 348 CIP 100 solution (e.g., 4 to 6% CIP Solution) from the skid 128 through the lower chamber 124 at a pressure in a range between approximately 40 psi and approximately 50 psi (e.g., 42 to 48 psi) for five to ten minutes. The spray device valve 140, the product inlet spray device valve 146, and the pressure valve 148 close in step 352 to complete the second step of the spray device cycle.

A third step of the backflush cycle may immediately follow the second step of the spray device cycle. In the third step of the backflush cycle, the first valve 132 opens in step 356 to backflush in step 360 the membrane filter 126 and the upper chamber 122 with a CIP 200 solution (e.g., 2 to 4% CIP solution) from the skid 128 at a pressure in a range between approximately 45 psi and approximately 50 psi for a duration of one to two minutes. The backflush valve 132 once again closes in step 364. The second valve 136 and the pressure valve 148 then open to allow PCA to flow at a pressure in a range between approximately 40 psi and approximately 50 psi (e.g., 42 to 48 psi) through the receiving device 112. A third step of the spray device cycle begins in step 368 by opening the spray device valve 140 and product inlet spray device valve 146 to spray (in step 372) the lower chamber 124 with CIP 200 solution (e.g., 2 to 4% CIP Solution) from the skid 128 at a pressure in a range between approximately 40 psi and approximately 50 psi (e.g., 42 to 48 psi) for a duration of five to ten minutes. The spray device valve 140, the product inlet spray device valve 146, and the pressure valve 148 close in step 376 to complete the third step of the spray device cycle.

A final and fourth step of the backflush cycle may immediately follow the third step of the spray device cycle. The first valve 132 opens in step 380 to backflush (in step 382) the membrane filter 126 and the upper chamber 122 with hot water (e.g., at a temperature between 75 degrees C. and 90 degrees C., and preferably, in a range of approximately 80 degrees C. to approximately 85 degrees C.) from the skid 128 at a pressure in a range between approximately 45 psi and approximately 50 psi for a duration of one to two minutes. The first valve 132 then closes in step 384. The second valve 136 and the pressure valve 148 are then opened to allow PCA to flow at a pressure in a range between approximately 40 psi and approximately 50 psi (e.g., 42 to 48 psi) through the receiving device 112. A final and fourth step of the spray device cycle begins by opening 386 the spray device valve 140 and product inlet spray device valve 146 to spray in step 388 the lower chamber 124 with hot water (e.g., at a temperature between 75 degrees C. and 90 degrees C., and preferably, in a range of approximately 80 degrees C. to approximately 85 degrees C.) from the skid 128 at a pressure in a range between approximately 40 psi and approximately 50 psi (e.g., 42 to 48 psi). After about five minutes from the start of the final step of the spray device cycle, a rotojet spray device located within the mixing tank 116 is initiated, spraying hot water (e.g., at a temperature between 75 degrees C. and 90 degrees C., and preferably, in a range of approximately 80 degrees C. to approximately 85 degrees C.) from the skid 128 at a pressure in a range between approximately 40 psi and approximately 50 psi (e.g., 42 to 48 psi) for simultaneously operation. A rotojet is a CIP device currently used during cleaning of formulation tanks (i.e., mixing tank 116). The rotojet provides high-impact, multi-axis rotation of solid stream cleaning solutions, providing 360° coverage. After ten minutes, the spray device valve 140 and product inlet spray device valve 146 close in step 390 and the rotojet spray device continues for an additional five minutes, at which point the rotojet spray device stops.

A drying cycle is performed after the fourth step of the spray device cycle. The second valve 136 and the pressure valve 148 remain open allowing PCA to flow through the receiving device 112 at a pressure in a range between approximately 45 psi and approximately 50 psi for a duration of one to five minutes to dry the receiving device 112. The second valve 136 and the pressure valve 148 close. As previously described, the receiving device 112 is washed separately from the big bag station 104, and may be completely dried before cleaning the big bag station 104. Drying times after cleaning can be reduced by the incorporation of heated air blown from top down and through spray devices 140, 146.

Depending on the cleaning requirements of the particular industry utilizing the PTS 100 (e.g., food, cosmetic, pharmaceutical industries), the parameters of each step of the backflush and spray device cycles may be different. For example, the timing of each step, the concentration, temperature, or type of cleaning solution, and/or the applied pressure may be changed to meet industry standards and requirements.

Figure 7:
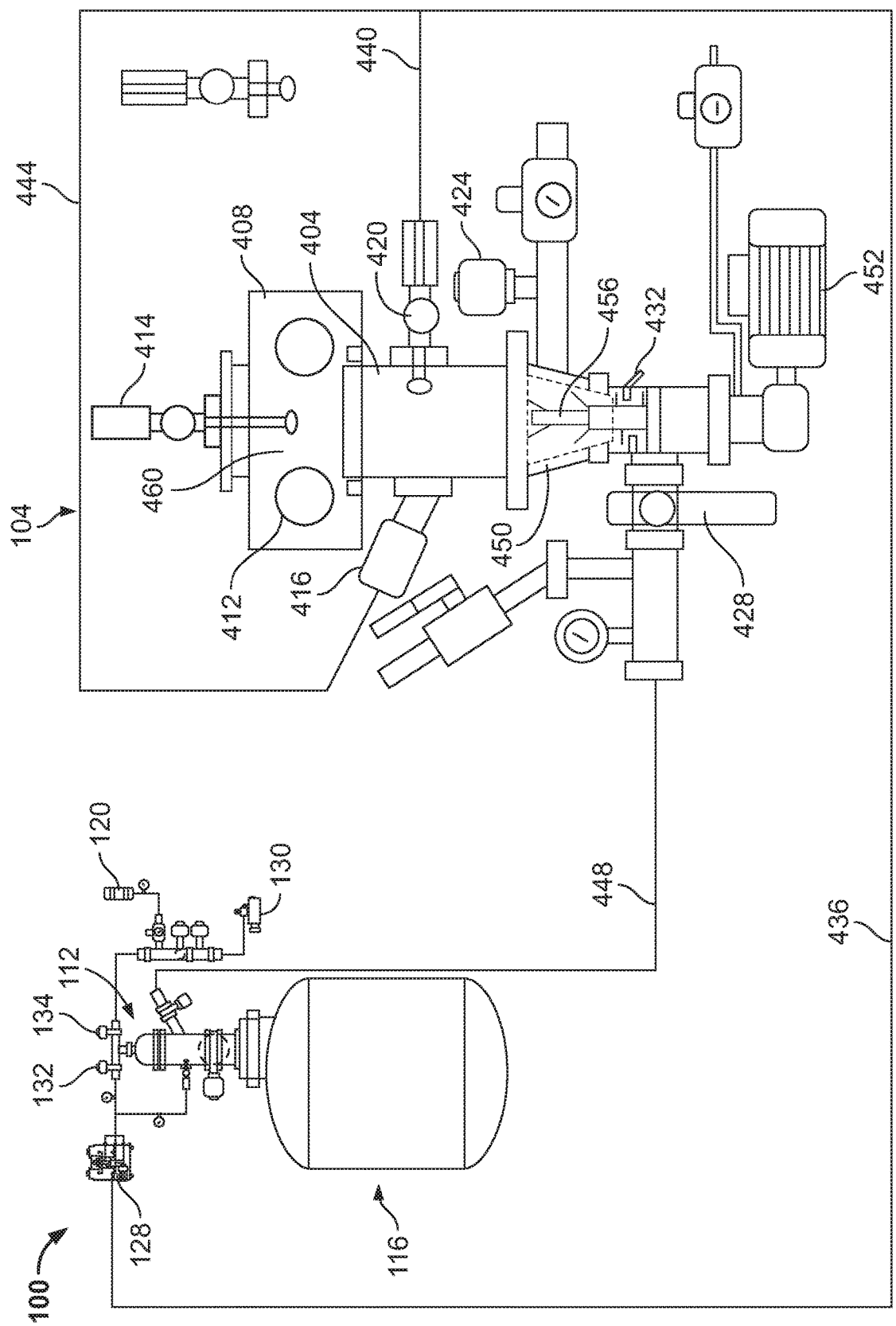
FIG. 7 is a schematic diagram of a big bag station (BBS) of the PTS of FIG. 2 assembled in accordance with the teachings of the present disclosure.

In FIG. 7, the big bag station (BBS) 104 is shown in more detail and is assembled according to the teachings of the present disclosure. The BBS 104 includes a bag body 404 disposed within a glove box 408 with openings 412 for providing an operator access to the bag body 404. A spray device 414 is attached to the glove box 408 for cleaning within the glove box 408. The bag body 404 is coupled to a deduster valve 416, a spray device valve 420, a fluidizer valve 424, a C-valve 428, and a drain valve 432. The skid 128 is coupled to the BBS 104 via a conduit 436 to provide washing fluid through the conduit 436 and into a spray device line 440 to the spray device 420. The conduit is also coupled to the deduster valve 416 via a deduster line 444. The pressure source 120 is coupled to the fluidizer valve 424 via a fluidizer line (not illustrated). The drain valve 432 is coupled to a drain line 448, which empties the washing fluid. The drain valve 432 is built into the system 104 allowing the washing solution to drain from the lower section of a cone member 450 of the BBS 104. An agitation device 452 is coupled to the bag body 404 and operates by spinning a plurality of blades 456 disposed in the cone member 450 to mix a washing fluid within the bag body 404 during the cleaning process described below.

Figure 8:
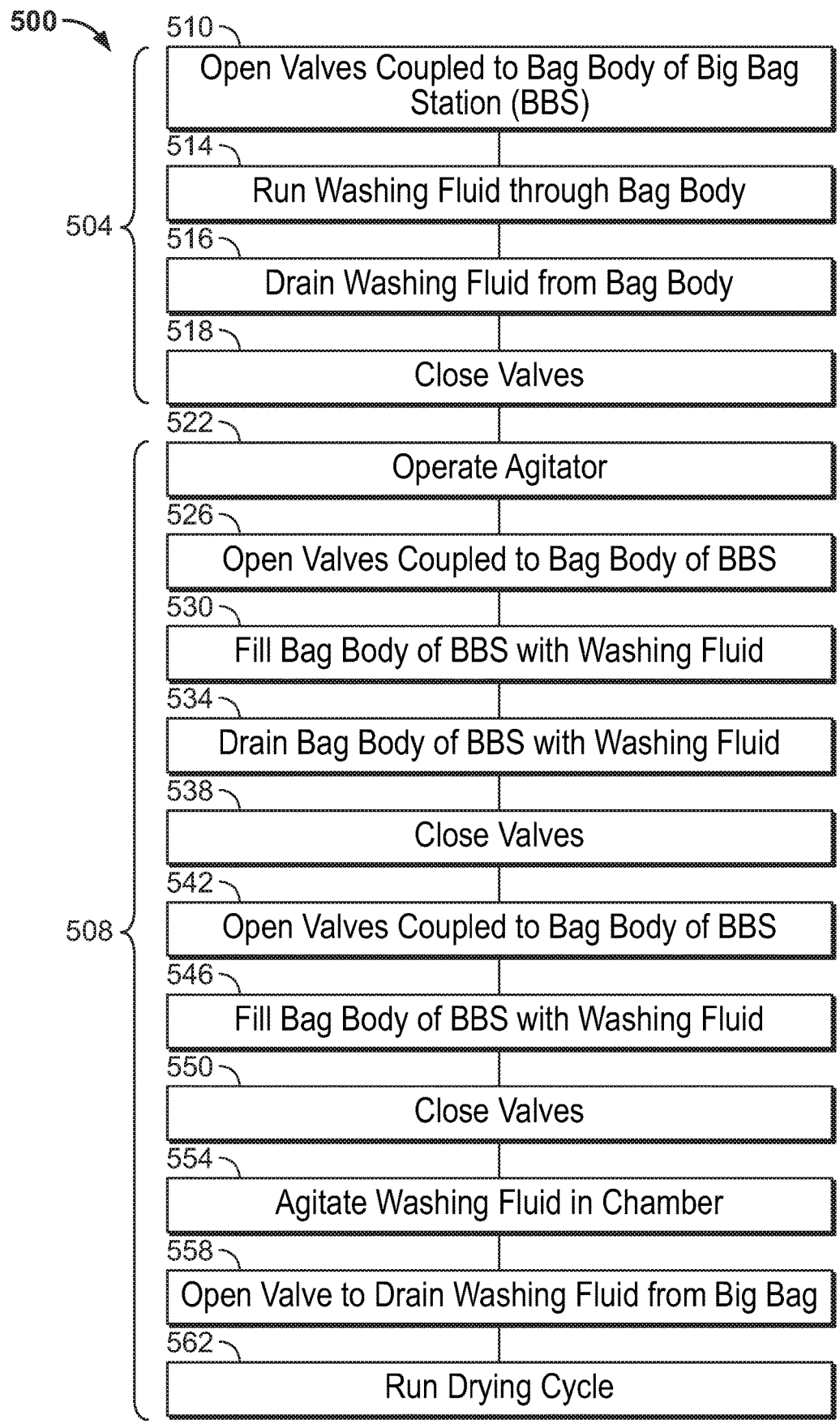
FIG. 8 is a flow diagram of a CIP process or method of cleaning the BBS of FIG. 7 in accordance with the teachings of the present disclosure.

An exemplary cleaning method or process 500 for cleaning the BBS 104 is depicted in FIG. 8 and is described with reference to FIG. 7. The cleaning process 500 includes an initial pre-wash cycle 504 (including steps 510, 514, 516, 518), a fill and agitate cycle (including steps 522, 526, 530, 534, 538, 542, 546, 550, 554, and 558), and a drying cycle (step 562).

The pre-wash cycle 504 begins by securing a cap 460 to the bag body 404 inside the glove box 408. The deduster valve 416, the spray device valve 420, the fluidizer valve 424, and the C-valve 428 open in step 510 and ambient water washes the BBS 104 at step 514. The skid 128 supplies the ambient water at a pressure in a range between approximately 45 psi and approximately 50 psi through conduit 436 for a duration of one to two minutes. At the same time, ambient water is removed by vacuum from the BBS 104 at step 516 through the drain line 448. The drain line 448 is connected to the receiving device 112 mounted on top of the mixing tank 116, and the ambient water is ejected from the receiving device 112 by the pressure source 120. During this one to two-minute cycle, the deduster and drain valves 416, 432 open and close every 15 seconds, then the valves 416, 420, 424, 428 and 432 close in step 518. The drain valve 432 opens and closes during the cycle to ensure no pharmaceutical residue or washing solution remains trapped in the drain valve 432 to avoid contamination of the system or cross-contamination of another batch. In some examples, the draining feature may be automated. In some examples, the opening and/or closing of the C-valve 448 may be delayed to create sufficient vacuum to ensure removal of the cleansing solution from the BBS, through the drain line 448, and ejected into the mixing tank 116.

The fill and agitate cycle 508 begins with valves 416, 420, 424, 428, and 432 closed at step 518, and the agitator 452 equipped with blades 456 turned on in step 522. The dedusting line 444, spray device line 440, and fluidization line (not illustrated) are flushed with ambient water at a pressure in a range between approximately 45 psi and approximately 50 psi for about two minutes. The fill and agitate cycle 508 includes repeatedly rinsing and draining the bag body 404 and then filling the bag body 404, agitating the fluid in the bag body 404, and draining the fluid from the bag body 404. The fill and agitate cycle 508 includes six steps in which a process of rinsing and draining alternates with a process of filling, agitating, and draining. The rinsing and draining process includes a step of opening 526 the deduster valve 416, spray device valve 420, fluidizer valve 424, and C-valve 428, a step of filling 530 the bag body 404 with washing fluid, and a step of draining 534 the fluid. After the fluid is drained, the valves 420, 424, 428 close at step 538. The filling, agitating, and draining process includes a step of opening 542 the deduster valve 416, spray device valve 420, and fluidizer valve 424, and a step of filling 546 the bag body 404 with washing fluid. The valves 416, 420, and 424 then close 544 at step 550, and the fluid is agitated at step 554 before the fluid is drained at step 558 from the bag 404. The washing fluid is agitated by operating the agitator 452, and adjusting the speed of rotation of the blades 456.

In one example, a first step of the fill and agitate cycle 508 begins with a rinsing and draining process. The deduster valve 416, spray device valve 420, fluidizer valve 424, and C-valve 428 open, and the BBS 104 is rinsed with CIP 100 solution (e.g., 4 to 6% CIP solution) supplied by the skid 128 at a pressure in a range between approximately 45 psi and approximately 50 psi through conduit 436 for a duration of two minutes. At the same time, the CIP 100 solution is drained from the BBS 104 through the drain line 448 and to the receiving device 112 mounted on top of the mixing tank 116, where the CIP 100 solution is then ejected by the pressure source 120. During this two-minute cycle, the deduster valve 416 and the drain valve 432 open and close every 15 seconds. Then the valves 416, 420, 424, 428, and 432 close.

A second step of the fill and agitate cycle 508 includes the filling, agitating, and draining process. The deduster valve 416, spray device valve 420, and fluidizer valve 424 open and the bag body 404 is filled with CIP 100 solution (e.g., 4 to 6% CIP solution) from the skid 128 at a pressure in a range between approximately 45 psi and approximately 50 psi. The deduster, spray device, and fluidizer valves 416, 420, and 424 close, and the solution is agitated by the agitator 452 for a duration of ten minutes. The C-valve 428 then opens and the CIP 100 solution is removed from BBS 104 through drain line 448 to the receiving device 112 mounted on top of the mixing tank 116, where the CIP 100 solution is then ejected by the pressure source 120. The C-valve 428 then closes. This process is repeated three more times. However, in some examples, this step may be repeated more or fewer than three times.

A third step of the fill and agitate cycle 508 includes the rinsing and draining process. The deduster valve 416, spray device valve 420, fluidizer valve 424, and C-valve 428 open and the BBS 104 is rinsed with CIP 200 solution (e.g., 2 to 4% CIP solution) supplied by the skid 128 at a pressure in a range between approximately 45 psi and approximately 50 psi through conduit 436 for a duration of two minutes. At the same time, the CIP 200 solution is removed from the BBS 104 through drain line 448 and to the receiving device 112 mounted on top of the mixing tank 116, where the CIP 200 solution is then ejected by the pressure source 120. During this two-minute cycle, the deduster valve 416 and the drain valve 432 open and close every 15 seconds. Then valves 416, 420, 424, 428, and 432 close.

A fourth step of the fill and agitate cycle 508 includes the filling, agitating, and draining process. The deduster valve 416, spray device valve 420, and fluidizer valve 424 open and the bag body 404 is filled with CIP 200 solution (e.g., 2 to 4% CIP solution) from the skid 128 at a pressure in a range between approximately 45 psi and approximately 50 psi. The deduster valve 416, spray device valve 420, and fluidizer valve 424 close and the solution is agitated by the agitator 452 for a duration of ten minutes. The C-valve 428 then opens and the CIP 200 solution is removed from BBS 104 through drain line 448 to the receiving device 112 mounted on top of the mixing tank 116, where the CIP 200 solution is then ejected by the pressure source 120. The C-valve 428 then closes. This process is repeated three more times. However, in some examples, this step may be repeated more or fewer than three times.

A fifth step of the fill and agitate cycle 508 includes the rinsing and draining process. The deduster valve 416, spray device valve 420, fluidizer valve 424, and C-valve 428 open and the BBS 104 is rinsed with hot water (e.g., at a temperature between 75 degrees C. and 90 degrees C., and preferably, in a range of approximately 80 degrees C. to approximately 85 degrees C.) supplied by the skid 128 at a pressure in a range between approximately 45 psi and approximately 50 psi through conduit 436 for a duration of two minutes. At the same time, the hot water is removed from the BBS 104 through drain line 448 and to the receiving device 112 mounted on top of the mixing tank 116, where the hot water is then ejected by the pressure source 120. During this two-minute cycle, the deduster valve 416 and the drain valve 432 open and close every 15 seconds, and then the valves 416, 420, 424, 428, and 432 close.

A sixth step includes turning off the agitator 452 and opening the spray device valve 420 to rinse the BBS 104 with hot water (e.g., at a temperature between 75 degrees C. and 90 degrees C., and preferably, in a range of approximately 80 degrees C. to approximately 85 degrees C.) supplied by the skid 128 at a pressure in a range between approximately 45 psi and approximately 50 psi through conduit 436. At the same time, the hot water is removed from the BBS 104 through the drain line 448 and to the receiving device 112 mounted on top of the mixing tank 116, where the hot water is then ejected by the pressure source 120. After about three minutes, and specifically three minutes and fifteen seconds into spray device cycle, the deduster valve 416 opens to introduce hot water (e.g., at a temperature between 75 degrees C. and 90 degrees C., and preferably, in a range of approximately 80 degrees C. to approximately 85 degrees C.) from the skid 128 at a pressure in a range between approximately 45 psi and approximately 50 psi for simultaneously rinsing operation. At around four seconds, and specifically three minutes and 55 seconds, the spray device valve 420 closed. At four minutes, the deduster valve 416 closes.

Drying of the BBS 104 and the drain line 448 at 554 is accomplished with continuation of vacuum and ejection cycles, thereby circulating PCA throughout the equipment and process lines. Drying times after cleaning can be reduced by the incorporation of heated air blown from top down and through the various spray devices 414, 420 and ports of the BBS 104. Any remaining water or moisture is removed from the BBS 104 through the drain line 448 and to the receiving device 112 mounted on top of the mixing tank 116, where it is then ejected by the pressure source 120. The duration of this drying cycle varies dependent upon certain factors, such as, for example, air flow velocity, air temperature and humidity, internal surface area of the BBS 104 model, inner diameter and length of process lines, and inner diameter and length of the drain line 448. Depending on the cleaning requirements of the particular industry utilizing the BBS 104 (e.g., food, cosmetic, pharmaceutical industries), the parameters of each step of the pre-wash and fill and agitate cycles may be different. For example, the timing of each step, the concentration, temperature, or type of cleaning solution, and/or the applied pressure may be changed to meet industry standards and requirements.

Figure 1:
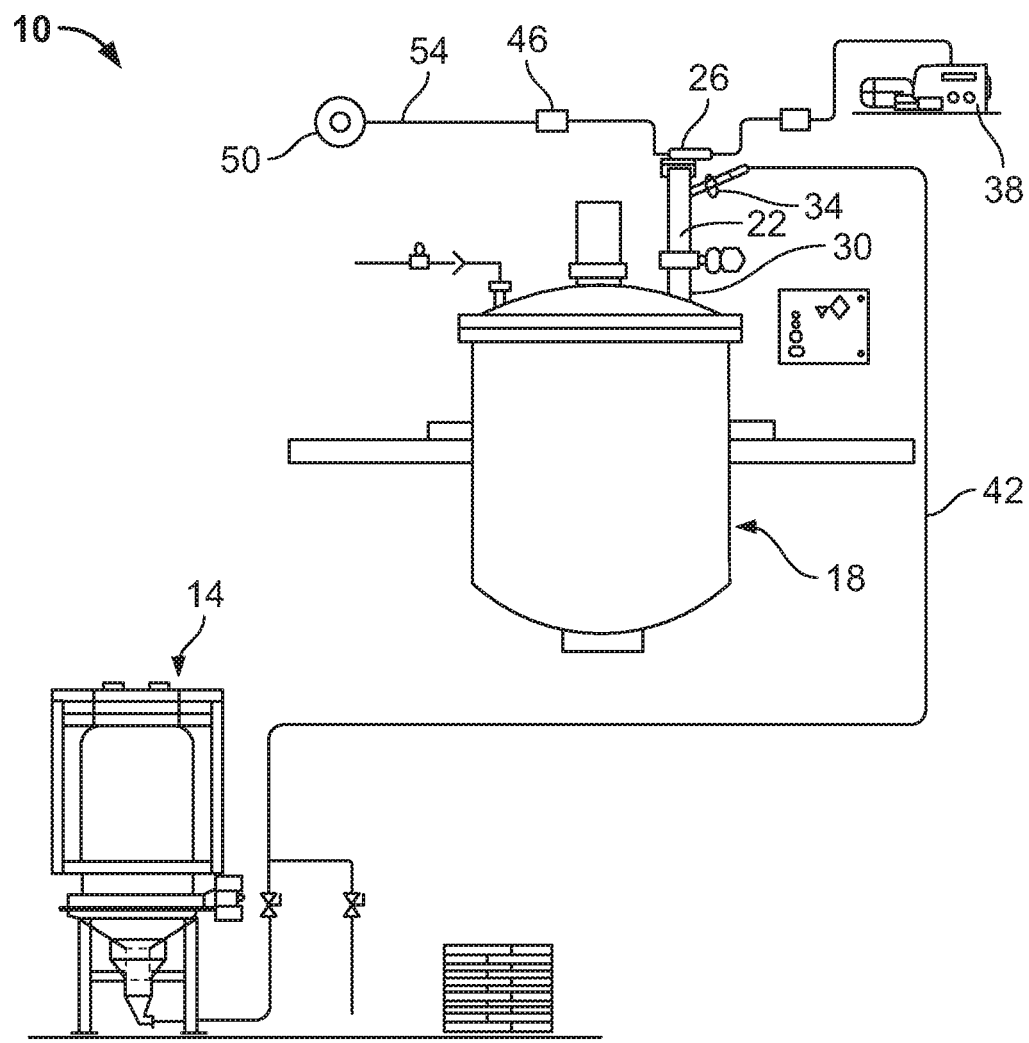
FIG. 1 is a schematic diagram of a known powder transfer system (PTS)

The disclosed CIP processes and methods 200, 300, 500 apply a combination of fluid dynamics and mechanical principles that effectively clean-in-place pharmaceutical process and cleaning solution residues from complex powder transfer systems to meet the requirements deemed acceptable by pharmaceutical and other industries. The disclosed CIP processes and methods 200, 300, 500 provide a number of advantages over the current cleaning processes used to clean the powder transfer 10 system of FIG. 1.

The cleaning processes and methods 200, 300 for cleaning the receiving device 112 include the application of PCA to enhance the distribution of cleaning solutions and cleansing action, as shown in FIG. 5. The application of PCA in the way described above also creates a positive pressure "air barrier" that prevents re-introduction of pharmaceutical residues and cleaning solutions into previously cleaned areas of the equipment. Current cleaning methods only use PCA to dry out the system or to eject the washing fluid, and do not benefit from an air barrier when the receiving device is cleaned. In these existing methods, when spray devices clean the lower chamber of the receiving device, powder can potentially get caught in the porous membrane filter.

The cleaning method and process of the present disclosure provides multiple cleaning mechanisms that enhance removal of pharmaceutical residues from difficult to clean places. The CIP methods and processes apply a combination of holding cleaning solutions while adjusting fluid velocities and shear stress to break up residue and improve cleaning. This is achieved, for example, by agitating and holding the washing fluid when cleaning the BBS 104.

As mentioned earlier, the cleaning process takes a "top-down" approach, and utilizes sequential "zone coverage and purging" cleaning methods. In this way, the cleaning methods disclosed herein provide effective removal of pharmaceutical and cleaning solution residues without reintroducing aforesaid residues back into the complex powder transfer system. This is contrary to current cleaning methods, in which the entire system is filled to clean and then evacuated at once. For example, current methods of cleaning the BBS include filling the big bag with cleaning fluid and evacuating the BBS with a reduced vacuum. In the present disclosure, a full vacuum (e.g., pulling at a range between approximately 20 inHg and approximately 30 inHg, and preferably between 25 inHg to 29 inHg) beneficially cleans out the drain line 448. Current methods also include COP, meaning operators break down the equipment to perform manual cleaning operations. Not only is this process labor intensive, but many facilities holding the powder transfer system are limited in space to allow COP.

The figures and description provided herein depict and describe preferred examples of a cleaning process for a cylindrical receiving device and for a big bag station of a complex powder transfer system for purposes of illustration only. One skilled in the art will readily recognize from the foregoing discussion that alternative variants of the components illustrated herein may be employed without departing from the principles described herein. Thus, upon reading this disclosure, those of skill in the art will appreciate still additional alternative structural and functional designs and methods for a CIP processes. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the methods and components disclosed herein without departing from the spirit and scope defined in the appended claims.

What is claimed:

1. A method of cleaning a powder transfer system, the method comprising:

providing a dry powder transfer system including a washing liquid source, a spray device valve in fluid communication with the washing liquid source, a backflush valve in fluid communication with the washing liquid source, a receiving device having an upper chamber in fluid communication with the backflush valve and a lower chamber in fluid communication with the spray device valve, and a membrane filter extending across the receiving device between the upper and lower chambers;

opening the backflush valve to initiate a backflush cycle;

running the backflush cycle to backflush the membrane filter and wash the upper chamber with a liquid from the washing liquid source, the backflush cycle including four steps;

closing the backflush valve after the backflush cycle completes;

opening the spray device valve to initiate a spray device cycle, the spray device cycle including four steps;

running the spray device cycle to wash the lower chamber with a liquid from the washing liquid source, the lower chamber being washed separately from the upper chamber;

closing the spray device valve after the spray device cycle completes;

alternating the four steps of the spray device cycle with the four steps of the backflush cycle; and opening a pressure valve to provide a processed control air (PCA) to the receiving device.

2. The method of claim 1, wherein providing the dry powder transfer system including the membrane filter comprises providing the dry powder transfer system including a planar membrane filter disposed laterally across the receiving device between the upper and lower chamber; and running the backflush cycle comprises dispensing the liquid from the washing liquid source through a conduit fluidly coupled to the backflush valve and having an opening to dispense the washing liquid perpendicularly to the planar membrane filter.

3. The method of claim 1, wherein providing the dry powder transfer system further comprises providing the dry powder transfer system including a dry powder product inlet connected to the lower chamber of the receiving device and a second spray device valve in fluid communication with the washing fluid source; and further comprising:

opening the second spray device valve to initiate a second spray device cycle; and running the second spray device cycle to wash the dry powder product inlet with the liquid from the washing liquid source.

4. A method of cleaning a dry powder transfer system, the method comprising:

providing a dry powder transfer system including a washing liquid source, a spray device valve in fluid communication with the washing liquid source, a backflush valve in fluid communication with the washing liquid source, a receiving device having an upper chamber in fluid communication with the backflush valve and a lower chamber in fluid communication with the spray device valve, and a membrane filter extending across the receiving device between the upper and lower chambers;

opening the backflush valve to initiate a backflush cycle;

running the backflush cycle to backflush the membrane filter and wash the upper chamber with a liquid from the washing liquid source;

closing the backflush valve after the backflush cycle completes;

opening the spray device valve to initiate a spray device cycle;

running the spray device cycle to wash the lower chamber with a liquid from the washing liquid source, the lower chamber being washed separately from the upper chamber;

closing the spray device valve after the spray device cycle completes; and opening a pressure valve to provide a processed control air (PCA) to the receiving device.

5. The method of claim 4, wherein running the backflush cycle includes running at least four backflush cycles, wherein the washing liquid in a first step is water and the washing liquid in a second step is a CIP solution.

6. The method of claim 4, wherein opening the pressure valve includes opening the pressure valve after running the backflush cycle and before running the spray device cycle.

7. The method of claim 4, wherein opening the pressure valve includes opening the pressure valve before opening the spray device valve such that the lower chamber is sprayed with cleaning fluid while PCA blows in the lower chamber.

8. The method of claim 4, further comprising providing an air barrier between the membrane filter and the lower chamber during the spray device cycle.

9. The method of claim 4, wherein opening the spray device valve to initiate the spray device cycle comprises opening the spray device valve to initiate the spray device cycle after the backflush valve is closed after the backflush cycle completes.

10. The method of claim 4, wherein providing the dry powder transfer system including the membrane filter comprises providing the dry powder transfer system including a planar membrane filter disposed laterally across the receiving device between the upper and lower chamber; and running the backflush cycle comprises dispensing the liquid from the washing liquid source through a conduit fluidly coupled to the backflush valve and having an opening to dispense the washing liquid perpendicularly to the planar membrane filter.

11. The method of claim 4, wherein providing the dry powder transfer system further comprises providing the dry powder transfer system including a dry powder product inlet connected to the lower chamber of the receiving device and a second spray device valve in fluid communication with the washing fluid source; and further comprising:

opening the second spray device valve to initiate a second spray device cycle; and running the second spray device cycle to wash the dry powder product inlet with the liquid from the washing liquid source.

12. The method of claim 4, wherein running the backflush cycle includes running a first step of the backflush cycle by providing ambient water from the washing liquid source at a pressure in a range between 45 psi and 50 psi.

13. The method of claim 12, wherein running the backflush cycle includes running a second step after running the first step, wherein running the second step includes providing a clean-in-place (CIP) solution from the washing liquid source to the upper chamber.

14. The method of claim 13, wherein running the second step includes providing the CIP solution at a pressure in a range between 45 psi and 50 psi.

15. The method of claim 12, wherein running the backflush cycle includes running a third step of the backflush cycle after running the second step, wherein running the third step includes providing a second CIP solution from the washing liquid source to the upper chamber, and wherein the second CIP solution has a different acidity than the first CIP solution.

16. The method of claim 15, wherein running the third step includes providing the second CIP solution at a pressure in a range between 45 psi and 50 psi.

17. The method of claim 15, wherein running the backflush cycle includes running a final step by providing water from the washing liquid source to the upper chamber.

18. The method of claim 17, wherein running the final step includes providing hot water at a temperature in a range between 75 degrees Celsius and 90 degrees Celsius and at a pressure in a range between 45 psi and 50 psi.

19. The method of claim 15, wherein running the spray device cycle includes running a first step of the spray device cycle by spraying water into the lower chamber.

20. The method of claim 19, wherein running the first step of the spray device cycle includes spraying ambient water into the lower chamber at a pressure in a range between 40 psi and 50 psi.

21. The method of claim 19, wherein running the first step of the spray device cycle includes running the first step of the spray device cycle after the first step of the backflush cycle completes.

22. The method of claim 19, wherein running the spray device cycle includes running a second step of the spray device cycle after running the first step of the spray device cycle, the second step includes spraying a CIP solution from the washing fluid source into the lower chamber.

23. The method of claim 22, wherein running the second step of the spray device cycle includes spraying the CIP solution into the lower chamber at a pressure in a range between 40 psi and 50 psi.

24. The method of claim 22, wherein running the second step of the spray device cycle includes running the second step of the spray device cycle after the second step of the backflush cycle completes and before the third step of the backflush cycle initiates.

25. The method of claim 22, wherein running the spray device cycle includes running a third step of the spray device cycle after running the second step of the spray device cycle, the third step of the spray device cycle includes spraying a second CIP solution into the lower chamber, the second CIP solution having a different acidity than the first CIP solution.

26. The method of claim 25, wherein running the third step includes spraying the second CIP solution into the lower chamber at a pressure in a range between 40 psi and 50 psi.

27. The method of claim 25, wherein running the third step of the spray device cycle includes running the third step of the spray device cycle after the third step of the backflush cycle completes and before the final step of the backflush cycle initiates.

28. The method of claim 25, wherein running the spray device cycle includes running a final step of the spray device cycle after running the third step of the spray device cycle, the final step including spraying water into the lower chamber.

29. The method of claim 28, wherein running the final step includes spraying hot water at a temperature in a range between 75 degrees Celsius and 90 degrees Celsius and into the lower chamber at a pressure in a range between 40 psi and 50 psi.

* * * * *